(12) United States Patent
Ito et al.

(10) Patent No.: US 6,971,462 B2
(45) Date of Patent: Dec. 6, 2005

(54) AIR GUIDE DEVICE IN VEHICLE SUCH AS MOTORCYCLE

(75) Inventors: Masamoto Ito, Saitama (JP); Kenji Tamura, Saitama (JP); Hidemi Minami, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 24 days.

(21) Appl. No.: 10/645,511

(22) Filed: Aug. 22, 2003

(65) Prior Publication Data

US 2004/0069550 A1 Apr. 15, 2004

(30) Foreign Application Priority Data

Aug. 26, 2002 (JP) ............................. 2002-245855

(51) Int. Cl.[7] .............................................. B60K 11/06
(52) U.S. Cl. .................................... 180/68.1; 180/229
(58) Field of Search ............................. 180/68.1, 229, 180/68.3, 68.4, 903, 69.24, 219, 68.5; 280/288.4; 296/78.1, 208

(56) References Cited

U.S. PATENT DOCUMENTS

| | | | |
|---|---|---|---|
| 2,171,042 A * | 8/1939 | Minton | 180/219 |
| 3,783,961 A * | 1/1974 | Hooper | 180/228 |
| 3,902,740 A * | 9/1975 | Lucier et al. | 280/304.3 |
| 4,728,121 A * | 3/1988 | Graves | 280/748 |
| 4,913,256 A * | 4/1990 | Sakuma | 180/229 |
| 4,925,231 A * | 5/1990 | Hamaguchi | 296/78.1 |
| 4,964,484 A * | 10/1990 | Buell | 180/219 |
| D361,311 S * | 8/1995 | Lindby | D12/126 |
| 5,577,570 A * | 11/1996 | Shiohara et al. | 180/219 |
| 5,577,747 A * | 11/1996 | Ogawa et al. | 180/220 |
| 5,608,194 A * | 3/1997 | Okazaki et al. | 181/228 |
| 5,653,206 A * | 8/1997 | Spurgin | 123/196 AB |
| 5,887,561 A * | 3/1999 | Spurgin | 123/196 AB |
| 5,984,035 A * | 11/1999 | Katoh et al. | 180/68.1 |
| 6,269,896 B1 * | 8/2001 | Tanaka et al. | 180/69.24 |
| 6,336,579 B1 * | 1/2002 | Sako | 224/413 |
| 6,357,542 B1 * | 3/2002 | Sako | 180/68.5 |
| 6,499,784 B2 * | 12/2002 | Takahashi | 296/37.1 |
| 6,651,769 B2 * | 11/2003 | Laivins et al. | 180/229 |
| 6,758,484 B1 * | 7/2004 | Rice | 280/304.4 |

* cited by examiner

*Primary Examiner*—J. Allen Shriver
(74) *Attorney, Agent, or Firm*—Birch, Stewart, Kolasch & Birch, LLP

(57) ABSTRACT

A chassis frame for a vehicle such as a motorcycle is provided with an engine mounted at the chassis frame and an engine guard near the engine spaced apart between chassis frame and the engine to protect the engine. The engine guard protrudes toward the chassis frame. An inclined surface is formed inside the chassis side of the engine guard so as to be oppositely faced against the engine, and an air guide passage is formed between the inclined surface and the engine. During operation of the vehicle, the air or wind passes through the air guide passage to enhance the cooling of the engine. The aforementioned arrangement prevents the disturbance or prohibition of the flow of engine cooling air during operation of the motorcycle while also enabling a relatively high degree of freedom in design with respect to an outer appearance of the engine guard and vehicle.

20 Claims, 8 Drawing Sheets

AIR GUIDE DEVICE IN VEHICLE SUCH AS MOTORCYCLE

CROSS-REFERENCES TO RELATED APPLICATIONS

This nonprovisional application claims priority under 35 U.S.C. § 119(a) on Patent Application No. 2002-245855 filed in Japan on Aug. 26, 2002, the entirety of which is herein incorporated by reference.

BACKGROUND OF THE INVENTION

1. Field of the Invention

The present invention relates to an air guide device in a vehicle, and more particularly for an air guide device in a motorcycle.

2. Description of the Background Art

Japanese Utility Application Model Laid-Open No. Sho 60-85291 provides an exemplary description of a motorcycle in which an engine guard is arranged near an engine to protect the engine while also being spaced apart from the engine. The engine guard protrudes toward the side of the motorcycle chassis. However, the present inventors have determined that the motorcycle described in the above document suffers from the following problems.

In the aforesaid motorcycle, the engine guard is made by bending or working a pipe member having a circular sectional shape. The pipe member having a circular sectional shape is selected since it has the advantage of not prohibiting the flow of air or wind, e.g., contributing to more efficient cooling of the engine. However, the circular shaped pipe member has some disadvantages during the bending process when a bending work is carried out and a member of optional shape cannot be attained. Accordingly, the engine guard made by the pipe member having a circular sectional shape is limited in its variations in design and orientation with respect to the engine. For example, the position of the fixing part is set at a certain location or the entire shape of the completed engine guard is limited to certain designs, e.g., it has a low degree of freedom in design. Further, when the pipe member having a circular sectional shape is used, the overall design and layout of the engine guard cannot be easily varied in its outer appearance.

Alternatively, if the engine guard is made with a plate member in lieu of the pipe member, either the fixing position of the plate member or the fixing angle of the engine guard may prohibit a flow of the wind contributing to cooling of the engine during vehicle operation.

SUMMARY OF THE INVENTION

The present invention overcomes the shortcomings associated with the background art and achieves other advantages not realized by the background art.

It is an object of the present invention to provide an air guide device, e.g., an engine guard, in a vehicle such as a motorcycle that does not prohibit a flow of engine cooling air during operation of the vehicle.

It is an object of the present invention to attain freedom in design and overall outer appearance of the air guide device.

One or more of these and other objects are accomplished by an air guide device for a vehicle comprising a chassis frame; an engine being mounted on the chassis frame; and an engine guard being arranged near the engine and protruding from the engine and the chassis frame spaced apart toward a side of the chassis frame so as to protect the engine, wherein an inner side of the engine guard at the chassis frame is formed with an inclined surface opposing an exterior surface of the engine. In this case, a relatively wide air guide passage is formed between the engine and the inclined surface of the engine guard and cooling of the engine is promoted by passing the running air through the air guide passage during its running operation.

One or more of these and other objects are further accomplished by an air guide device for a vehicle comprising a vehicle main body having a chassis frame and an engine; an accessory storage box being secured to a rear side of the vehicle main body; and an accessory storage box guard being arranged near the accessory storage box, the accessory storage box guard being spaced apart from the accessory storage box to protect the accessory storage box and protruding from a side of the chassis frame, wherein an inner side of the accessory storage box guard is formed with a flat surface opposing the accessory storage box and forming an air passage between the accessory storage box and the accessory storage box guard. In this case, a relatively wide air guide passage is formed between an accessory storage box fixed to the rear side of the vehicle main body and an inclined surface of the accessory storage box guard, the running wind after passing by the engine passes through the air guide passage and further runs toward the rear part of the vehicle, resulting in that the flow passage for cooling the engine is assured during its running operation.

One or more of these and other objects are further accomplished by an air guide device for a vehicle comprising a vehicle main body having a chassis frame and an engine; an accessory storage box being secured to a rear side of the vehicle main body; an accessory storage box guard being arranged near the accessory storage box, the accessory storage box guard being spaced apart from the accessory storage box to protect the accessory storage box and protruding from a side of the chassis frame, wherein an inner side of the accessory storage box guard is formed with a flat surface opposing the accessory storage box; and an engine guard being arranged near the engine and protruding from the engine and the chassis frame spaced apart toward a side of the chassis frame so as to protect the engine, wherein an inner side of the engine guard at the chassis frame is formed with an inclined surface opposing an exterior surface of the engine.

The air guide device may include a guard member(s) having an irregular-shaped sectional surface. In this case, since the guard member has an irregular-shaped sectional surface different from the circular sectional shape, it is possible to form either a flat surface or curved surface at a requisite location, resulting in flexibility of design.

The air guide device may also be formed by a bulge work, e.g., by molding. In this case, the guard member(s) of many types of shapes can be easily machined.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

The present invention will hereinafter be described with reference to the accompanying drawings. An air guide or engine guard device in a vehicle will be described hereinafter with reference to an exemplary motorcycle. Accordingly, the description relating to forward or rearward, and rightward or leftward directions is based on a chassis of the motorcycle as the frame of reference.

Figure 1:
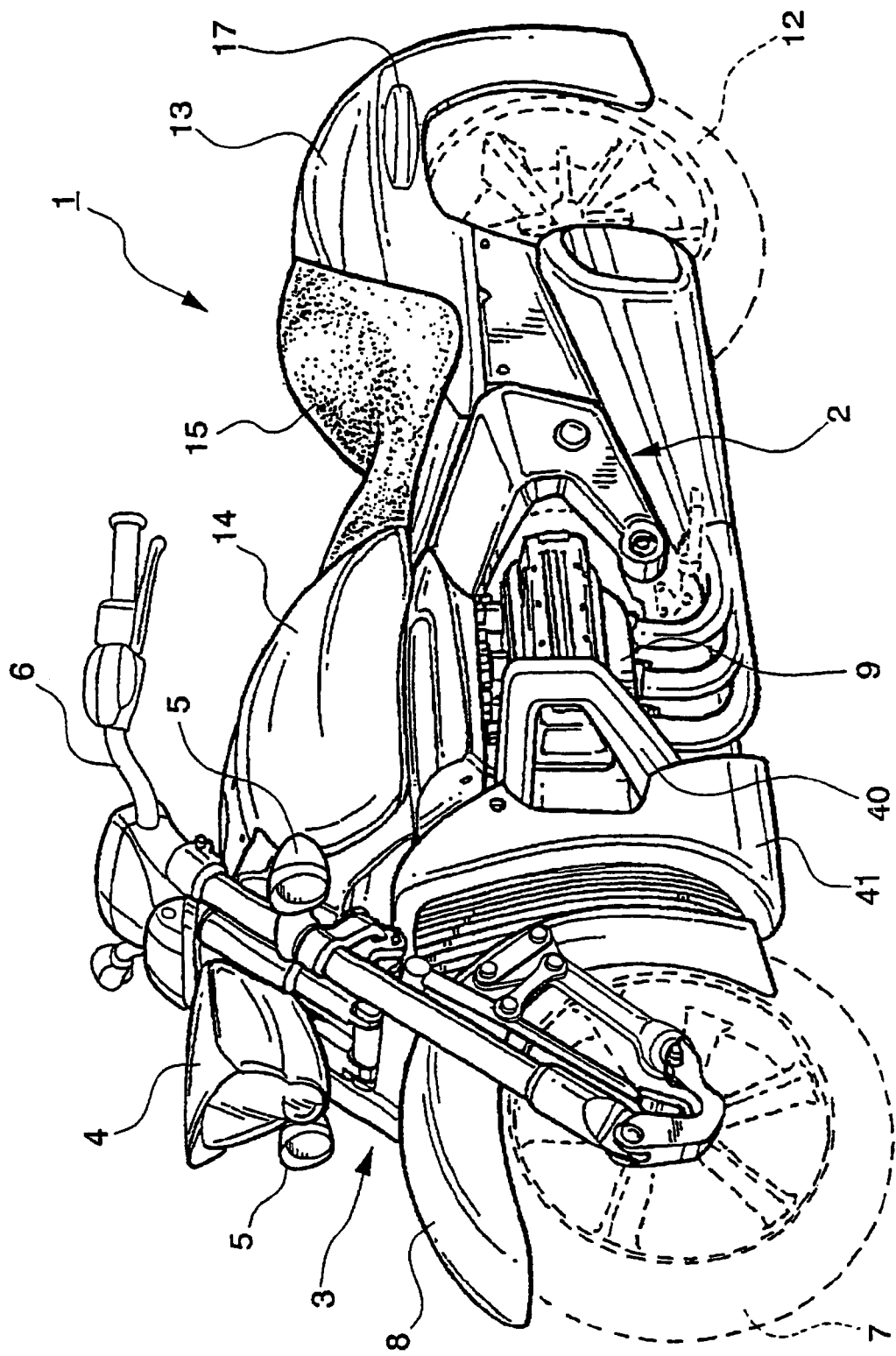
FIG. 1 is a perspective view of a motorcycle according to a preferred embodiment of the present invention.
Figure 2:
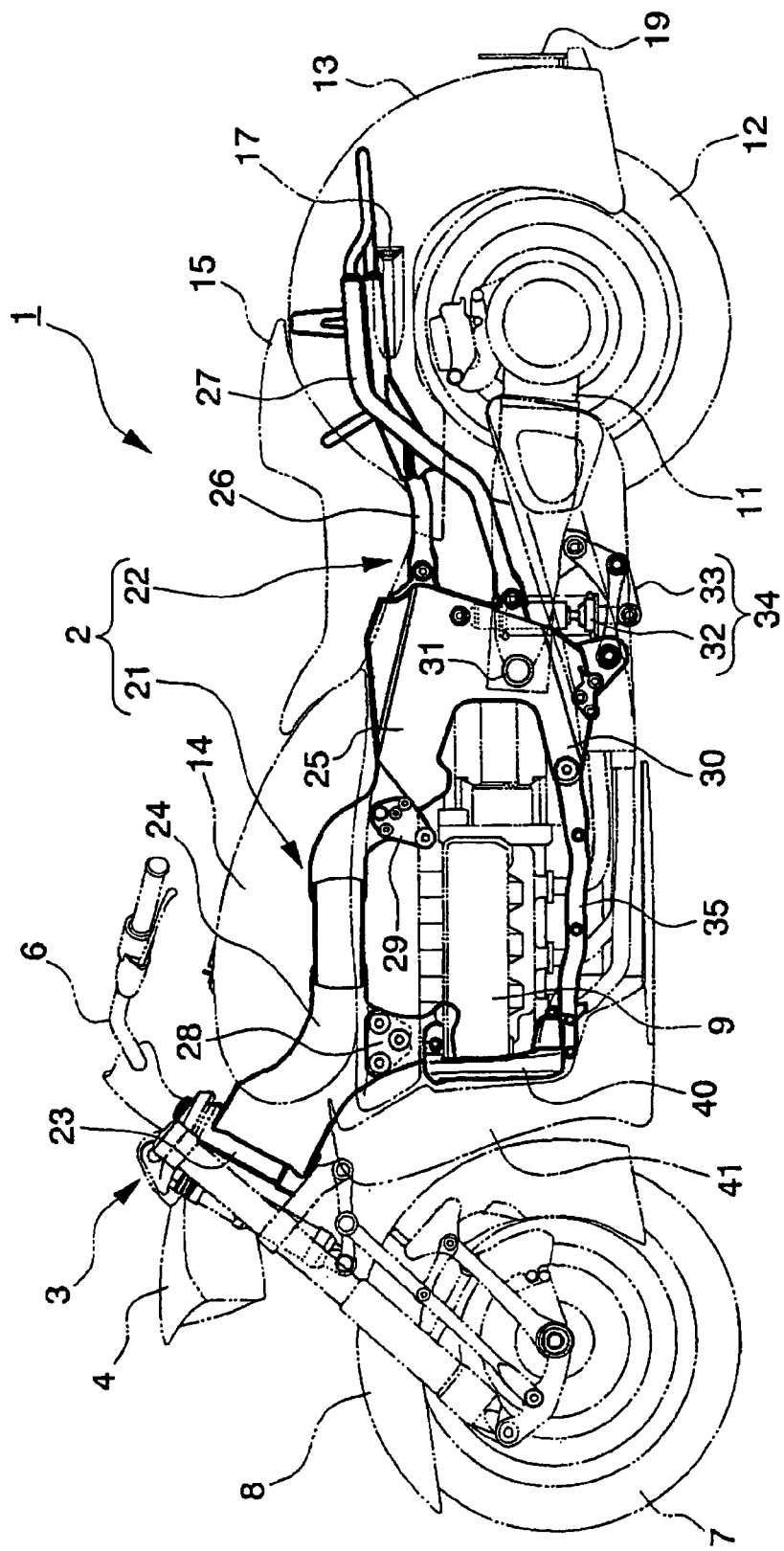
FIG. 2 is a side elevation of a motorcycle according to a preferred embodiment of the present invention.

FIG. 1 is a perspective view of a motorcycle according to a preferred embodiment of the present invention. FIG. 2 is a side elevation of a motorcycle according to a preferred embodiment of the present invention. The motorcycle 1 is a so-called American type, wherein it has a chassis frame 2, a link-type front suspension 3 rotatably supported at a front end of the chassis frame 2, a headlight 4 arranged at an upper part of the link-type front suspension 3, a pair of right and left blinkers 5 arranged below the headlight 4 of the link-type front suspension 3, and a steering handle 6 fixed to an upper end of the link-type front suspension 3 and arranged at an upper part of the chassis front part.

In addition, this motorcycle 1 includes a front wheel 7 rotatably supported at the link-type front suspension 3, a front fender 8 supported at the link-type front suspension 3 and covering the upper side of the front wheel 7, an engine 9 mounted at the chassis frame 2, a rear swing arm 11 slidably arranged around an axis extending along a lateral direction at the rear part of the chassis by the chassis frame 2, a rear wheel 12 rotatably mounted at the rear end of the rear swing arm 11 and rotated with a driving force of the engine 9, and a rear fender 13 supported by the chassis frame 2 and covering the upper side of the rear wheel 12. The motorcycle 1 also includes a tear-drop shaped fuel tank 14 arranged at an upper part of the chassis frame 2, a main seat 15 arranged at a rear part of the fuel tank 14 where a driver sits, a pair of right and left rear blinkers 17 arranged at a rear part of the rear fender 13, and a license plate fixing part 19 arranged at the rear end of the rear fender 13.

The chassis frame 2 includes a front frame 21 and a rear frame 22 each of which is arranged at a forward or a rearward part of the chassis frame 2, respectively. The front frame 21 includes a front end head pipe 23; and an upper frame 24 divided from the head pipe 23 into a right segment and a left segment, and extending in a inclined, lower rearward direction and further extending rearwardly in a horizontal direction. A down frame 25 having a pair of right and left plate members with a substantial U-shape (as seen in a side elevational view) is welded to the rear end of the upper frame 22, and extending rearwardly in a slightly inclined downward direction, rearwardly in a horizontal direction, then extending in a downward direction, and finally having a lower end extending in a forward direction. A plurality of connector members for connecting these pairs of right and left plate members are also provided in the front frame assembly 21.

The rear frame 22 includes right and left upper pipes 26 connected to the upper rear end of the down frame 25 and extending upwardly therefrom. Right and left down pipes 27 are connected to the substantial central rear end along a height direction of the down frame 25, and extend from the down frame 25 in a inclined, upper rearward direction, where these members are connected to the midway part of the upper pipe 26 and extending in a rearward horizontal direction.

The engine 9 is a horizontal, opposed type engine in which the right cylinder head, left cylinder head, right cylinder and left cylinder are arranged to be inclined outwardly to be oppositely faced to each other. The engine 9 is suspended by the engine hanger 28 formed at a lower part of the upper frame 24, the engine hanger 29 formed at a lower surface of the upper part of the down frame 25 and the engine hanger 30 formed at a front end of the lower part of the down frame 25. The rear swing arm 11 can be oscillated around a pivot 31 of the down frame 25 in a vertical direction with a base part of the front end being pivoted at the pivot 31 of the down frame. In addition, a rear suspension device 34 of a shock absorber unit 32 and the link mechanism 33 are placed between the rear swing arm 11 and the down frame 25. Accordingly, the rear wheel 12 dampens and absorbs vibration transmitted from the road surface through the shock absorber unit 32 and the linked mechanism 33.

Figure 3:
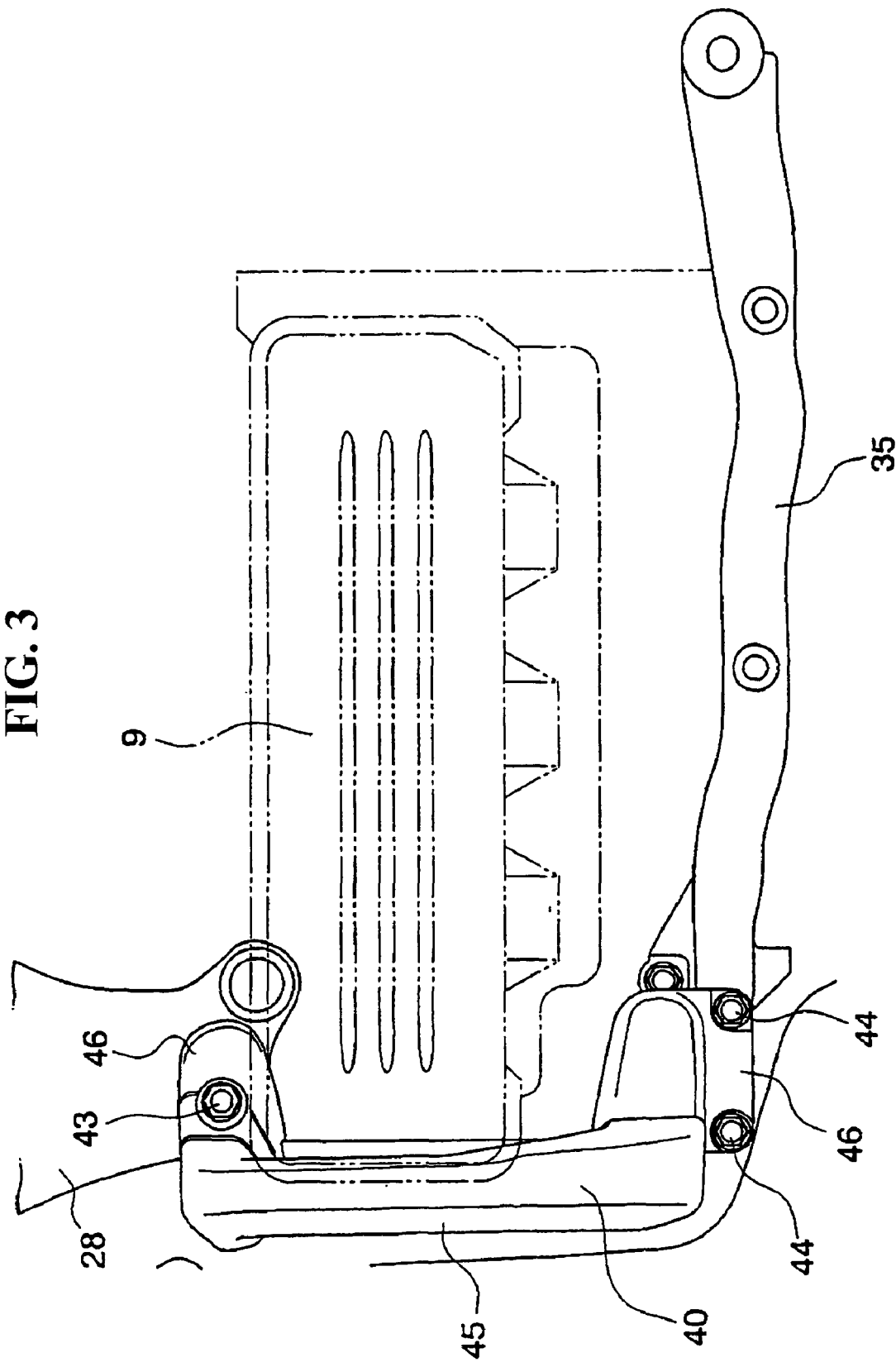
FIG. 3 is a partial expanded side elevation of a motorcycle according to a preferred embodiment of the present invention.

FIG. 3 is a partial, expanded side elevation of a motorcycle according to a preferred embodiment of the present invention. As shown in FIG. 3, the side frame 35 is screw set to the side part of the engine 9 at its front and rear ends to the lower front end of the engine 9 and the lower front end of the down frame 25 and fixed to extend in a forward or rearward direction of the chassis. In addition, the engine guard 40 is arranged near the front part of the engine to protect the engine 9 while being spaced apart, and protruding outward from the side of the chassis and extended in an upward or downward direction. A radiator cover 41 is also shown in FIGS. 1–2.

Figure 4:
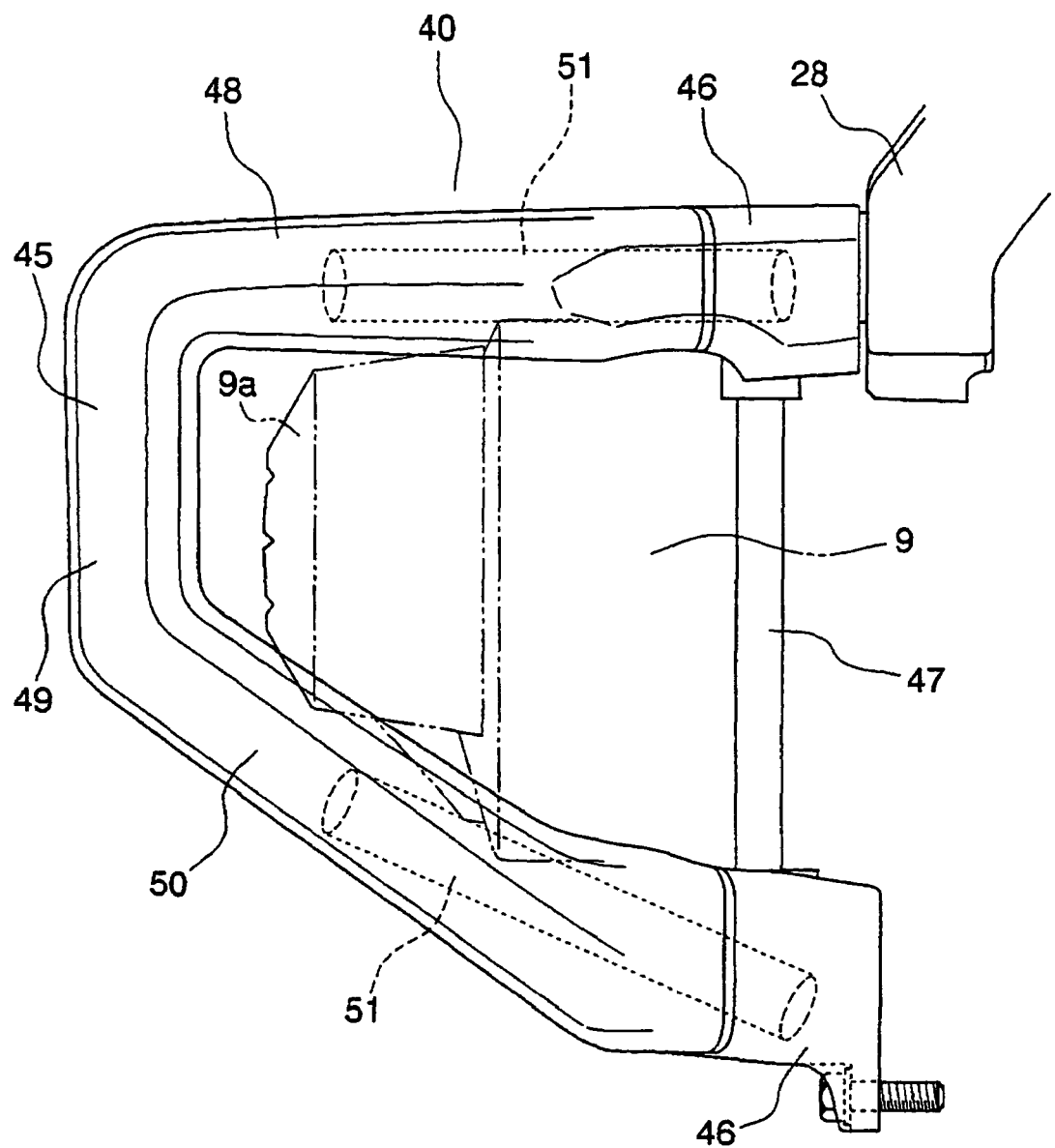
FIG. 4 is a partial front elevation of an engine guard fixing part and an engine of a motorcycle according to a preferred embodiment of the present invention.
Figure 5A:
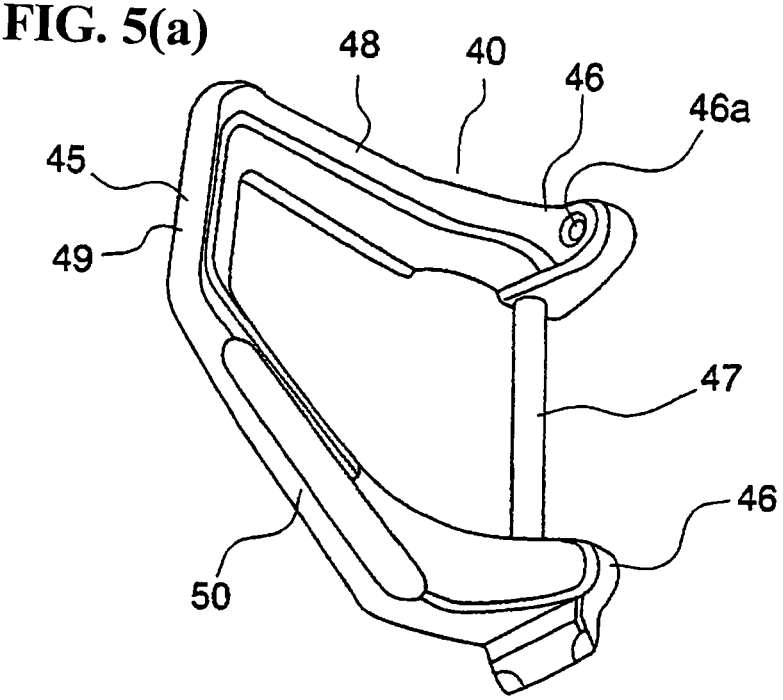
FIGS. 5(a)–5(b) are perspective views of an engine guard of a motorcycle according to a preferred embodiment of the present invention.
Figure 5B:
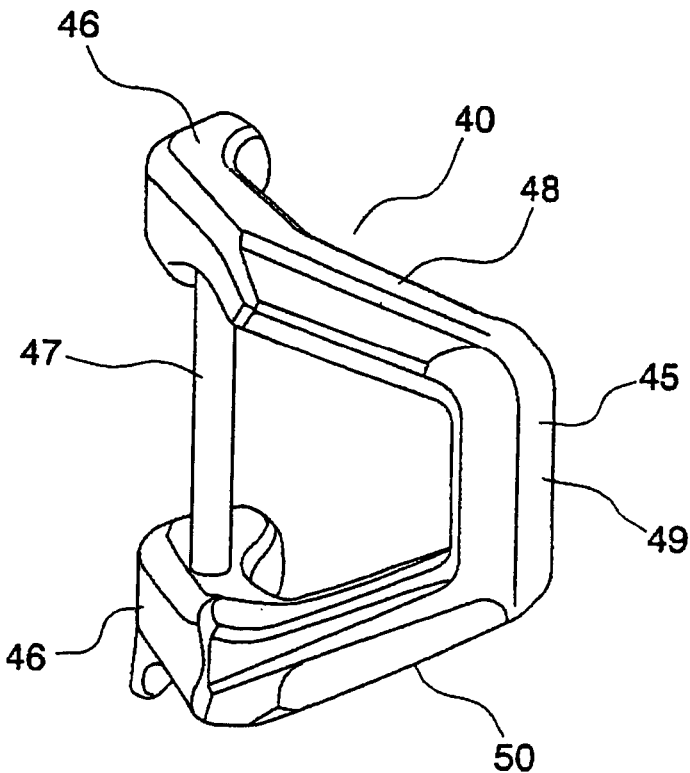
Figure 6:
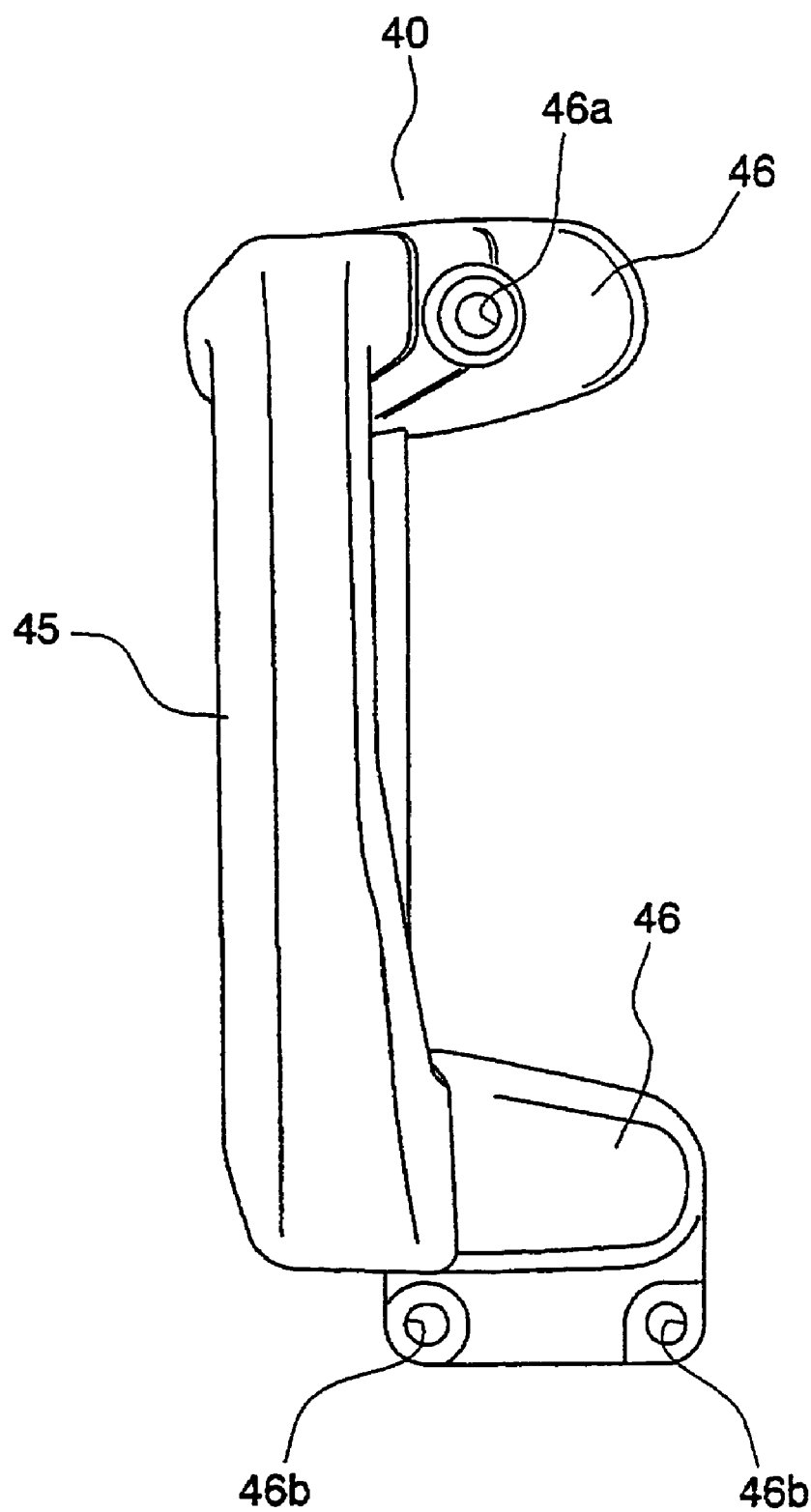
FIG. 6 is a front elevation view for showing an engine guard of a motorcycle according to a preferred embodiment of the present invention.

FIG. 4 is a partial front elevation of an engine guard fixing part and an engine of a motorcycle according to a preferred embodiment of the present invention. FIG. 5 is a perspective view of an engine guard of a motorcycle according to a preferred embodiment of the present invention. FIG. 6 is a front elevation view for showing an engine guard of a motorcycle according to a preferred embodiment of the present invention. As shown in FIGS. 4 to 6, the engine guard 40 includes a hollow part 45 entirely formed into a substantial U-shape, solid fixing segments 46, 46 fixed at both ends of the hollow part 45 and filled with material inside, and a connecting pipe 47 connecting the fixing segments 46, 46 to each other. As shown in FIG. 4, the hollow part 45 includes a horizontal segment 48 extending in a horizontal direction to cover the upper part of the head cover 9a of the engine 9 when the engine cover 40 is fixed to the chassis, a vertical segment 49 curved to cross at a right angle with the horizontal segment 48 and extending in a vertical direction to cover the side part of the head cover 9a, and an inclined segment 50 curved approximately 45° from the vertical segment 49 and extending in an inclined, downward direction to cover the lower part of the head cover 9a. The hollow part 45 has an irregular sectional shape formed into a bulge work in which a certain pressure is applied inside the raw material under utilization of liquid to perform a bulged-out molding, wherein both ends are connected to the fixed segments 46, 46 formed by forging, e.g., through welding. In addition, the fixed segments 46, 46 and the connecting pipe 47 are also connected with welding.

A reinforcing pipe member 51 is embedded inside each of the horizontal segment 48 of the hollow part 45 and the inclined segment 50 while being fixed to the fixed segments 46 by a proper fixing method such as a welding and the like. The engine guard 40 having the aforesaid configuration is fixed to the chassis by a method wherein the threaded hole 46a formed at the upper fixed segment 46 coincides with a threaded hole integrally formed with the engine hanger 28 of the upper frame 24 and at the same time the threaded hole 46b formed at the lower fixed segment 46 coincides with the threaded hole formed at the side frame 35. The threaded holes are used to fix the engine guard 40 to the chassis by bolts 43, 44 (refer to FIGS. 3 and 4).

Figure 7:
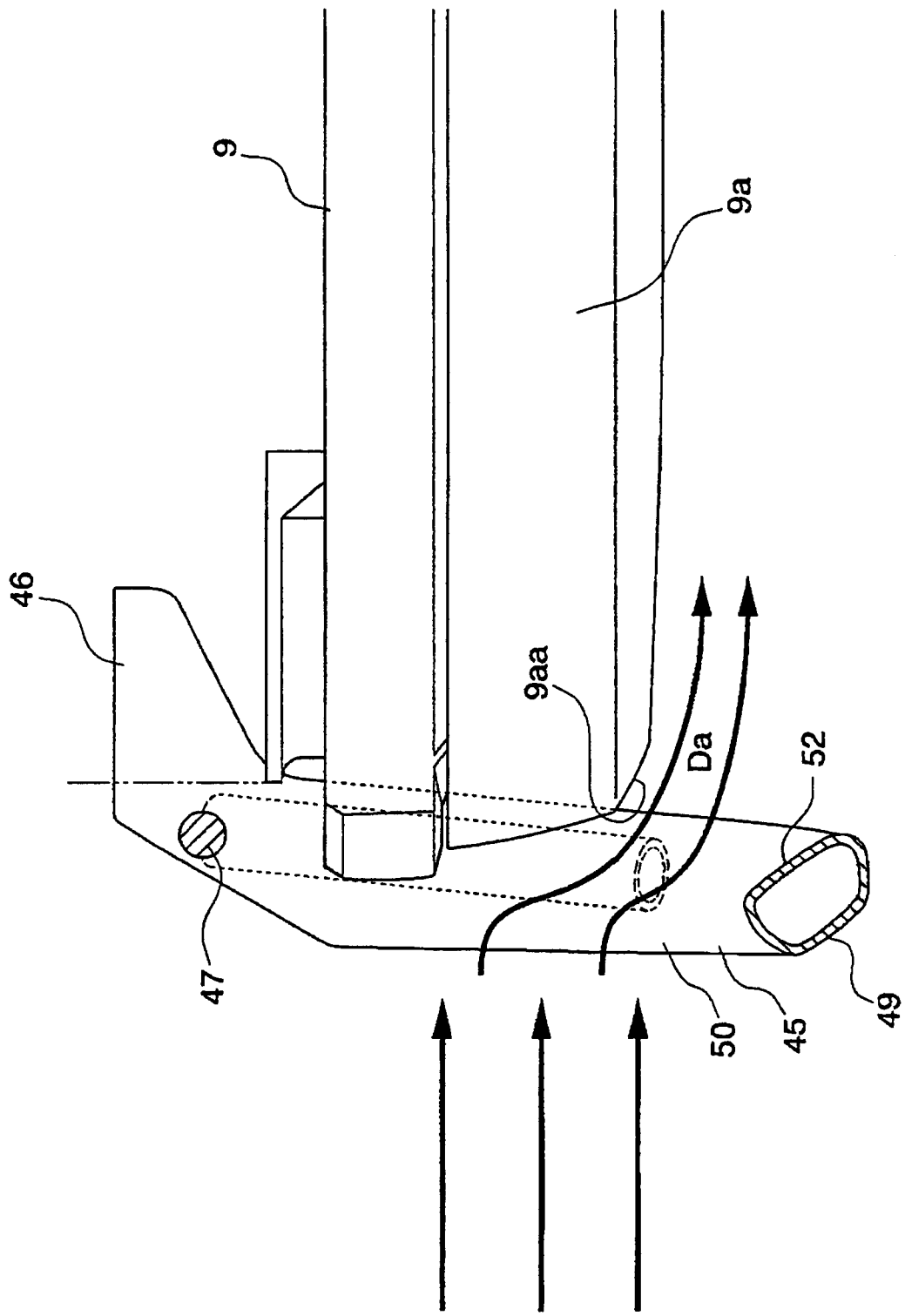
FIG. 7 is a partial top plan view in section of an engine guard fixing part of a motorcycle and a part of an engine according to a preferred embodiment of the present invention.

FIG. 7 is a partial top plan view in section of an engine guard fixing part of a motorcycle and a part of an engine according to a preferred embodiment of the present invention. As shown in FIG. 7, the preferred embodiment is made such that the vertical segment 49 of the hollow part 45 is formed into a trapezoid section with a major axis inclined in respect to the forward or rearward direction. With this arrangement, the vertical segment 49 is formed such that an inclined surface 52 is formed at a segment where it enters inside the chassis when it is fixed to the chassis. The inclined surface 52 is inclined such that it may oppositely face against the head cover 9a of the engine and it is expanded gradually outside the chassis as it is directed rearwardly of the chassis.

Thus, in accordance with the air guide and engine guard device of the motorcycle having the aforesaid configuration, the inclined surface 52 is formed to be oppositely faced against the head cover 9a of the engine 9 inside the chassis of the engine guard 40 and inside the chassis of the vertical segment 49 of the hollow part 45. In particular, the inclined surface 52 of the vertical segment 49 forms the air guide passage Da between these elements together with the inclined surface 9aa of the cylinder head 9a of the engine 9. Accordingly, when the motorcycle runs, the air striking against the front part of the engine 9 through the side part of the front wheel 7 flows through the air guide passage Da and rearwardly along the side part of the engine 9 so as to form a series of engine cooling airflows.

As described above, irrespective of an arrangement of the engine guard 40, the engine guard 40 does not prohibit a flow of the running air contributing to the cooling of the engine 9. In turn, in consideration of an effect of negative pressure when the running air flows at the side part of the chassis, the engine cooling air passing through the air guide passage Da is increased in its volume, resulting in that a cooling effect of the engine 9 under the running air can be increased.

In addition, since the major part of the engine guard 40 is not made by bending of the pipe member, but by bulge machining or molding, it becomes possible to form it into a relatively free shape. For example, a sectional surface is freely changed for every section to enable its strength to be high and enable a space in respect to the associated components positioned near the engine guard to be freely set. In addition, its outer appearance can be enhanced as desired by the manufacturer.

Although the aforesaid preferred embodiment include the inclined surface 52 oppositely facing against the engine 9 inside the chassis of the engine guard 40, the present invention is not limited to this embodiment. In addition to forming of the inclined surface 52 at the engine guard 40, it may also be applicable in the vehicle such as a motorcycle having the accessory storage box 61 fixed to the rear side of the vehicle main body 60 having the chassis frame and the engine as shown in FIG. 8 that the inclined surface 63 is arranged at the accessory storage box guard 62 set near the accessory storage box 61.

The accessory storage box guard 62 is provided spaced apart between it and the accessory storage box 61 and protruded toward the side of the chassis so as to protect the accessory storage box 61 fixed to the rear side of the vehicle main body 60, and the inclined surface 63 may be formed inside the chassis side of the accessory storage box guard 62 so as to oppositely face against the accessory storage box 61.

Figure 8:
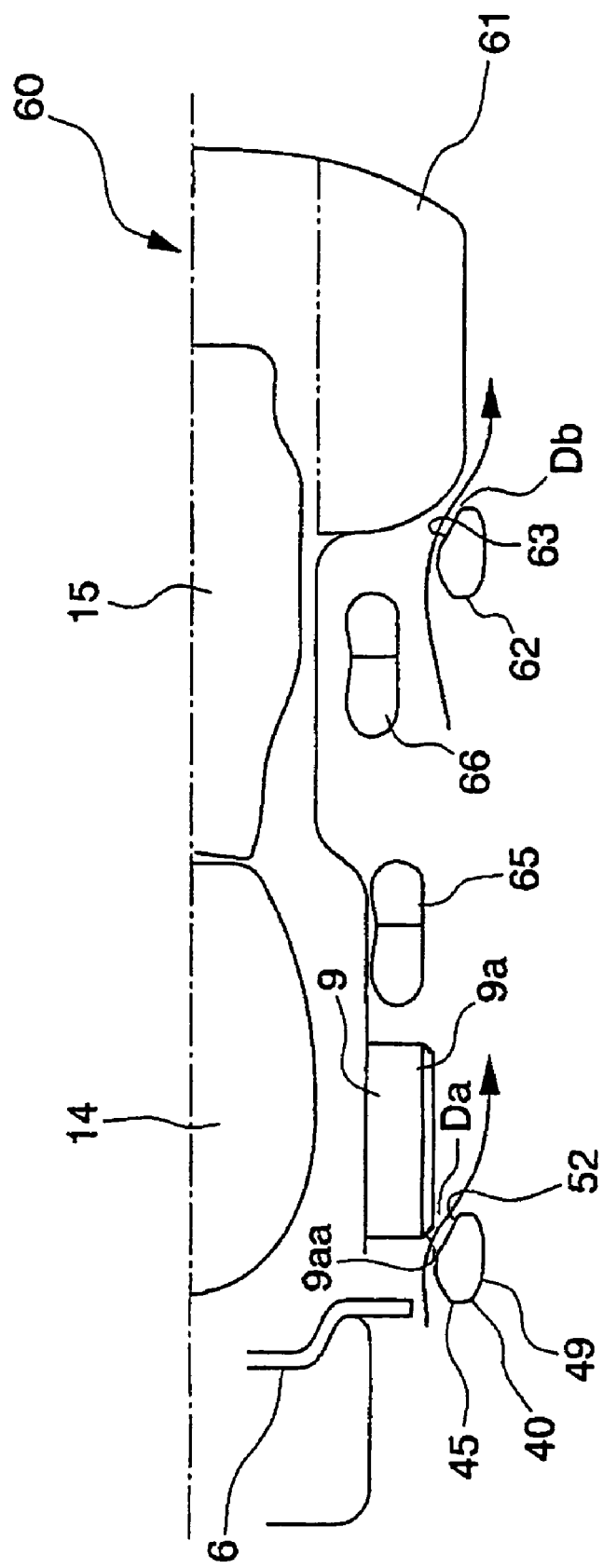
FIG. 8 is a schematic top plan view of a motorcycle according to a preferred embodiment of the present invention while the motorcycle is operating.

FIG. 8 is a schematic top plan view of a motorcycle according to a preferred embodiment of the present invention while the motorcycle is operating. In this case, as shown in FIG. 8, the wind or air passing by the engine 9 or the driver and co-passenger's legs 65, 66 flows through the relative wide air guide passage Db formed between the accessory storage box 61 and the inclined surface 63 of the accessory storage box guard 62 and is released to a rearward side of the vehicle. This results in an adequate air flow for engine cooling and the removal of hot air around the legs 65 of the driver can be assured. The present invention not only provides an effective cooling of the engine but also enables an air flow preferable for the driving environment, e.g., with respect to the driver.

In addition, although the preferred embodiment has been described in reference to the case of the motorcycle, the present invention is not limited to the motorcycle, but it can be applied to a three-wheeled vehicle or a buggy-type four-wheeled vehicle, such as an ATV (All-Terrain Vehicle).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air guide device for a vehicle comprising:
 a chassis frame;
 an engine being mounted on said chassis frame; and
 an engine guard being arranged near said engine and protruding from the engine and the chassis frame spaced apart toward a side of the chassis frame so as to protect the engine, said engine guard further including:
  a hollow portion formed into a substantial U-shape, said hollow portion including a horizontal segment extending transversely away from a side of said chassis frame in a horizontal direction,
a vertical segment extending generally parallel to the side of the chassis frame, and
an inclined segment extending at an inclined angle downwardly away from a lower portion of said vertical segment and toward said chassis frame, wherein an inner side of said engine guard at the chassis frame is formed with the inclined segment opposing an exterior surface of said engine.

2. The air guide device according to claim 1, wherein said engine guard has an irregular-shaped cross sectional surface.

3. The air guide device according to claim 1, wherein said engine guard is formed by molding.

4. The air guide device according to claim 1, further comprising an air passage being formed between said engine guard and said engine.

5. The air guide device according to claim 1, further comprising a reinforcing pipe member embedded within engine guard of the air guide device.

6. An air guide device for a vehicle comprising:
a vehicle main body having a chassis frame and an engine;
an accessory storage box being secured to a rear side of said vehicle main body; and
an accessory storage box guard being arranged near said accessory storage box, said accessory storage box guard being spaced apart from the accessory storage box to protect the accessory storage box and protruding from a side of the chassis frame, wherein an inner side of said accessory storage box guard is formed with a flat surface opposing said accessory storage box and forming an air passage between said accessory storage box and said accessory storage box guard and said accessory storage box guard further includes:
said flat surface forming a vertical segment extending generally parallel to the side of the chassis frame, and
an inclined segment extending at an inclined angle downwardly away from a lower portion of said vertical segment and toward said accessory storage box.

7. The air guide device according to claim 6, wherein said accessory storage box guard has an irregular-shaped cross sectional surface.

8. The air guide device according to claim 7, wherein said accessory storage box guard is formed by molding.

9. The air guide device according to claim 6, wherein said accessory storage box guard is formed by molding.

10. The air guide device according to claim 6, further comprising a reinforcing pipe member embedded within the engine guard of the air guide device.

11. An air guide device for a vehicle comprising:
a vehicle main body having a chassis frame and an engine;
an accessory storage box being secured to a rear side of said vehicle main body;
an accessory storage box guard being arranged near said accessory storage box, said accessory storage box guard being spaced apart from the accessory storage box to protect the accessory storage box and protruding from a side of the chassis frame, wherein an inner side of said accessory storage box guard is formed with a flat surface opposing said accessory storage box; and
an engine guard being arranged near said engine and protruding from the engine and the chassis frame spaced apart toward a side of the chassis frame so as to protect the engine, said engine guard further including:
a hollow portion formed into a substantial U-shape, said hollow portion including
a horizontal segment extending transversely away from a side of said chassis frame in a horizontal direction,
a vertical segment extending generally parallel to the side of the chassis frame, and
an inclined segment extending at an inclined angle downwardly away from a lower portion of said vertical segment and toward said chassis frame, wherein an inner side of said engine guard at the chassis frame is formed with the inclined segment opposing an exterior surface of said engine.

12. The air guide device according to claim 11, wherein said engine guard has an irregular-shaped cross sectional surface.

13. The air guide device according to claim 12, wherein said accessory storage box guard has an irregular-shaped cross sectional surface.

14. The air guide device according to claim 13, wherein said accessory storage box guard and said engine guard are formed by molding.

15. The air guide device according to claim 13, wherein said chassis frame is a motorcycle chassis frame.

16. The air guide device according to claim 11, wherein said accessory storage box guard has an irregular-shaped cross sectional surface.

17. The air guide device according to claim 11, wherein said engine guard is formed by molding.

18. The air guide device according to claim 11, wherein said accessory storage box guard is formed by molding.

19. The air guide device according to claim 11, wherein said accessory storage box guard further includes:
said flat surface forming a vertical segment extending generally parallel to the side of the chassis frame, and
an inclined segment extending at an inclined angle downwardly away from a lower portion of said vertical segment and toward said accessory storage box.

20. The air guide device according to claim 11, further comprising a reinforcing pipe member embedded within the engine guard of the air guide device.

* * * * *